United States Patent [19]

Christel, Jr.

[11] 4,322,223

[45] Mar. 30, 1982

[54] ADSORBENT FRACTIONATORS WITH ELECTRONIC SEQUENCE TIMER CYCLE CONTROL AND PROCESS

[75] Inventor: Conrad Christel, Jr., Ithaca, N.Y.

[73] Assignee: Pall Corporation, Glen Cove, N.Y.

[21] Appl. No.: 25,510

[22] Filed: Mar. 30, 1979

[51] Int. Cl.³ .......................................... B01D 53/04
[52] U.S. Cl. ........................................ 55/18; 55/33;
    55/58; 55/62; 55/162; 55/179; 55/387
[58] Field of Search ................ 55/25, 21, 20, 33, 62,
    55/75, 163, 179, 208, 270, 387, 196, 389, 67,
    271, 275, 162, 58; 364/500–502, 569; 34/15, 54,
    80

[56] References Cited

U.S. PATENT DOCUMENTS

| | | | |
|---|---|---|---|
| 2,306,610 | 12/1942 | Barrer | 55/75 X |
| 2,442,191 | 5/1948 | Black | 55/75 X |
| 2,800,197 | 7/1957 | Wynkoop | 55/62 X |
| 2,944,625 | 7/1960 | Skarstrom | 55/33 |
| 3,410,793 | 11/1968 | Stranahan et al. | 364/502 |
| 3,448,561 | 6/1969 | Seibert et al. | 55/33 X |
| 3,513,631 | 5/1970 | Seibert et al. | 55/33 |
| 3,658,655 | 4/1972 | Heere | 364/501 |
| 3,775,946 | 12/1973 | Brazzel | 55/62 |
| 3,898,047 | 8/1975 | Cramer | 55/25 |
| 4,023,940 | 5/1976 | Shultz | 55/163 |
| 4,127,395 | 11/1978 | McKey et al. | 55/33 |
| 4,162,146 | 7/1979 | Seibert | 55/179 X |
| 4,197,095 | 4/1980 | White, Jr. et al. | 55/21 X |
| 4,205,967 | 6/1980 | Sandman et al. | 55/21 |
| 4,247,311 | 1/1981 | Seibert et al. | 55/179 X |

FOREIGN PATENT DOCUMENTS

| | | | |
|---|---|---|---|
| 633137 | 12/1949 | United Kingdom | 55/58 |
| 677150 | 8/1952 | United Kingdom | 55/58 |

*Primary Examiner*—Robert H. Spitzer

[57] ABSTRACT

A method and apparatus are provided for adsorbing one or more first gases from a mixture thereof with a second gas to reduce the concentration of first gas in the mixture to below a permissible maximum concentration by passing the mixture in contact with and from one end to another end of one of two beds of a sorbent having a preferential affinity for the first gas, adsorbing first gas thereon to form a gaseous effluent having a concentration thereof below the maximum, while passing a purge flow of gaseous effluent through the other of the two beds of sorbent to desorb first gas adsorbed thereon, regenerating the other bed for another cycle of adsorption; periodically interchanging the beds so that, alternately, one bed is on regeneration and the other on the adsorption portions of the cycle; timing the cycling in fixed timing intervals determined electronically by a combination of digital integrated circuitry including controlling cycling time at a period not shorter than the regeneration time; and switching the sorbent beds at the end of such cycling time. The system is particularly applicable to the drying of gases.

19 Claims, 10 Drawing Figures

ADSORBENT FRACTIONATORS WITH ELECTRONIC SEQUENCE TIMER CYCLE CONTROL AND PROCESS

Desiccant dryers have been marketed for many years and are in wide use throughout the world. The usual type is made up of two desiccant beds, one of which is being regenerated while the other is on the drying cycle. The gas to be dried is passed through the one desiccant bed in one direction in the drying cycle, and then, at a predetermined time interval, when the desiccant can be expected to have adsorbed so much moisture that there is a danger that the required low moisture level of the effluent gas will not be met, the influent gas is switched to the other bed, and the spent bed is regenerated by heating and/or by evacuation and/or by passing purge effluent gas therethrough, usually in counterflow.

Desiccant dryers on the market today are of two general types, a heat-reactivatable type, in which heat is applied to regenerate the spent desiccant at the conclusion of the drying cycle, and a heatless dryer, in which heat is not applied to regenerate the spent desiccant at the conclusion of the drying cycle, but which relies upon the use of a purge flow of dry gas, usually effluent gas from the bed on the drying cycle, which is passed through the spent bed at a lower pressure, with rapid cycling to conserve the heat of adsorption to aid in the regeneration of the spent bed. The use of a purge gas to regenerate at a lower pressure than the line pressure of the gas being dried is not, however, confined to heatless dryers, but was used in heat-reactivated desiccant dryers for many years before the advent of the heatless type.

Both types of dryers are normally operated with fixed time drying and regenerating cycles, usually equal in duration, with the length of the cycles being fixed according to the volume of desiccant available and the moisture content of the influent air. The time of the cycle is invariably fixed at much less time than might be permitted, in order to ensure that the moisture content of the effluent gas will always meet the system requirements. As the drying cycle proceeds, the desiccant bed becomes progressively more and more saturated from the inlet end towards the outlet end, and less and less capable of adsorbing moisture that is carried through it by the influent gas. Removal of moisture from the influent gas depends upon the rate of flow of the gas and the rate of moisture adsorption and moisture content of the adsorbent, as well as the temperature and pressure of gas within the bed. The rate of adsorption by the desiccant may decrease as the desiccant becomes loaded. Since the moisture content of an influent gas is rarely constant, the demand put upon the desiccant bed can vary, sometimes rather rapidly, and sometimes within rather wide limits. Consequently, a fixed time drying cycle must always be short enough to give a safe margin for moisture removal at maximum moisture content of the influent gas, and this means that frequently a fixed time cycle must be rather short, to be sure it is ended before the available remaining moisture capacity of the bed reaches too low a level. This means, of course, that in the average cycle, the moisture capacity of the bed may not be well utilized.

The life of a desiccant that is heated in order to regenerate it is to a considerable extent dependent upon the frequency of regeneration. It is a rule of thumb in the trade that a desiccant bed is good for a certain number of regenerations, and no more. Obviously, then, the effective life of a bed is shortened unnecessarily, whenever during each drying cycle the moisture capacity is not effectively utilized. Furthermore, the inability to achieve a full utilization of the effective bed capacity during each drying cycle, both in the case of heat-reactivated and heatless dryers, means that the volume of the desiccant bed must be more than what might be required, to provide the reserve capacity needed to adsorb extreme but occasional moisture levels of the influent gas during the fixed time period of the drying cycle.

Inefficient utilization of moisture capacity also leads to a considerable waste of purge gas with each cycle. Purge gas is normally bled off from the effluent gas, for the purpose of regeneration of a spent bed, and correspondingly reduces the yield of effluent. Each time a bed is transferred from the drying cycle to the regenerating cycle, a volume of purge gas equal to the open volume of the bed vessel is necessarily dumped, and lost. Short cycling means higher purge losses than long cycling.

Such losses are particularly severe in the case of heatless dryers, which require much more frequent cycling. Indeed, the choice between a heat-regenerated and a heatless dryer frequently is dictated by the frequency of recycling required. Skarstrom in U.S. Pat. No. 2,944,627, dated July 12, 1960, describes a type of heatless dryer which purports to represent an improvement on those described some years earlier by Wynkoop, U.S. Pat. No. 2,800,197, dated July 23, 1957, and in British Pat. Nos. 633,137 and 677,150. Skarstrom showed that by very rapid cycling between adsorption and desorption in the respective zones, the desorption cycle could effectively utilize the heat of adsorption for regeneration of spent desiccant. Skarstrom accordingly taught the use of times in the adsorption cycle not exceeding two to three minutes, preferably less than one minute, and very desirably less than twenty seconds. Such cycling times are of course shorter than Wynkoop's, which was of the order of thirty minutes or higher, as shown in the graph of FIG. 2, or the cycling times ranging from five minutes to thirty minutes, of British Pat. Nos. 633,137; 677,150 demonstrated that the adsorption and desorption cycles need not necessarily be equal.

The drawback of the Skarstrom system, however, is the very considerable volume of purge gas lost with each cycle, and this loss is very much greater at a cycling time of, for instance, ten seconds, as compared to the British patents' five to thirty minutes, and Wynkoop's thirty minutes or longer. In the short Skarstrom cycles, of course, the capacity of the desiccant bed is very little utilized, but when no heat is applied to effect regeneration of the desiccant, it becomes more important not to carry the moisture content of the adsorbent beyond a certain minimum on the adsorption cycle, or it will be impossible effectively to regenerate the adsorbent on the regeneration cycle.

Dryers have been provided with moisture detectors in the effluent line, to measure dewpoints in the effluent gas. Because of their slow response and relative insensitivity to low dewpoints, however, such devices have not been and cannot be used to determine the cycling of a dryer when an effluent of low dewpoint or relative humidity is desired, since by the time the detector has sensed moisture in the effluent, the front has broken through the bed.

Seibert and Verrando, U.S. Pat. No. 3,448,561, patented June 10, 1969, provide process and apparatus for fractionating and especially drying gases with and without application of heat during regeneration which better utilize the moisture capacity of a desiccant bed by providing for regeneration thereof only when the moisture load on the bed requires it, and thus obtain optimum efficiency in use. During each adsorption cycle, the sorbent bed can be brought to the limiting moisture capacity at which regeneration can be effected under the available regenerating conditions, whether these be with or without the application of heat, and with or without the application of a reduced pressure. This is made possible by detecting the advance of the moisture front within the bed, as evidenced by the moisture content of the gas being dried, and halting the drying cycle whenever the front has reached a predetermined point in the bed, short of breaking out of the bed. This can be done automatically by providing in the desiccant bed means for sensing the moisture content of the gas being dried, and means responsive to moisture content to halt the drying cycle whenever a predetermined moisture content in the gas being dried is reached at that point.

This system controls cycling according to the degree of utilization of the adsorbent bed on stream, but it does not correct purge flow to minimize loss of purge gas according to regeneration of the spent bed off-stream. Moreover, it is dependent on the sensor for the cycling, and if the sensor is inoperative or malfunctioning, the cycling is thrown off, and the moisture front may break out of the bed.

Thus, in the process of the invention, the concentration of one or more first gases in a mixture thereof with a second gas is reduced to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases; and then while passing a purge flow of gaseous effluent through the other of the two beds of sorbent to desorb first gas adsorbed thereon, and reverse the advance of the concentration front of first gas in the bed, regenerating the other bed for another cycle of adsorption; periodically interchanging the beds so that, alternately, one bed is on regeneration and the other on the adsorption portions of the cycle; timing the cycling in fixed timing intervals determined electronically by a combination of digital integrated circuitry including a time delay oscillator, a binary counter and a logic module and controlling cycling time at a period not shorter than the regeneration time; and switching the sorbent beds at the end of such cycling time.

The gas fractionating apparatus in accordance with the invention comprises as the essential components at least one and preferably two sorbent beds adapted for alternate periodic adsorption and preferably counterflow regeneration; at least one or a plurality of solenoid valves movable between positions permitting and closing off the gas flow through the bed or beds during adsorption and regeneration; drivers for the solenoid valves; and an electronic sequence timer that comprises, in combination, digital integrated circuitry including a time delay oscillator, a binary counter, and a logic module in operative connection with the drivers for the solenoid valves, and controlling the gas flow through the adsorbent gas fractionator system according to the cycling intervals prescribed by the timer.

The apparatus of the invention is particularly applicable to the drying of gases.

While the apparatus of the invention can be composed of one desiccant bed, the preferred apparatus employs a pair of desiccant beds, disposed in appropriate vessels, which are connected to the lines for reception of influent gas to be fractionated, and delivery of effluent fractionated gas.

The apparatus can also include a check valve or throttling valve for the purpose of reducing pressure during regeneration, and multiple channel valves for cycling the flow of influent gas between the beds and for receiving the flow of effluent gas therefrom. In addition, a metering or throttling valve can be included to divert a portion of the dried effluent gas as purge in counterflow through the bed being regenerated.

The load of first gas on the sorbent built up in the course of the adsorption portion of the cycle depends upon the content of first gas in the second gas, which may be variable; gas flow rate; and inlet and outlet temperature and pressure. If however during the regeneration portion of the cycle the bed is fully regenerated, the loading does not matter, provided the concentration front of first gas in the bed does not break out of the bed. Accordingly, the timer is set for some cycling time at which one can be sure, under the operating conditions, that the front has not broken out of the bed, with complete utilization efficiency and optimum energy conservation.

Consequently, the electronic sequence timer utilized in the gas fractionators in accordance with the invention prescribes a series of fixed time intervals under which the fractionators operate.

The electronic sequence timer is made up of a combination of conventional and commercially available electronic components, none of which individually forms any part of the invention, but which in combination, in the circuitry to be described, make it possible to prescribe the fixed time intervals required for operation of the gas fractionators.

The heat of the electronic system is an oscillator or time delay device which generates electric impulses at selected rather short time intervals. The timer is in effect a self-excited electronic circuit whose output voltage is a periodic function of time. The oscillator should be capable of providing range of time interval delays between pulses, so as to facilitate the obtention of the desired time intervals, inasmuch as the short time interval pulses provided by the timer or oscillator are the basic building blocks on which the longer intervals are built up in the binary counter.

In principle, the timer generates pulses at selected time intervals. These are fed to a binary digital counter, which counts these pulses, and is composed of a plurality of stages or bits which in combination store information on the number of pulses at multiples of the time intervals. A plurality of logic gates arranged in a logic module are utilized to interpret the output states of the counter, respond to certain selected output combinations corresponding to the desired time intervals, and operate the solenoid drivers accordingly, thereby achieving the selected time intervals for each of the stages of the adsorption and desorption cycle of the gas fractionator.

One type of timer oscillator utilizes a circuit which makes it possible for it to trigger itself and free-run as a multivibrator. An external capacitor charges through one set of resistors, and discharges through another set. Thus, the timing interval can be varied within a desired range by varying the values of these two sets of resistors, which is readily done by simply selecting resistors of the required impedance. An example of this type of oscillator is the 555. Other types which may be utilized include flip-flop multivibrators, capacitance delayed op-amp with positive feedback, and capacitance-coupled nor gates.

The binary digital counter receives the pulses from the timing oscillator, and counts them. The counter can include any desired number of information units, as required for the timing intervals that need to be determined. In the system shown in the drawing, a 14 stage or bit binary counter is employed, since this is a readily available and quite satisfactory type. In the counter shown in the drawing, each counter stage is a static master-slave flip-flop, and the counter is advanced one count on the negative going transition of each input pulse. Other types can however be used.

This binary counter has a series of stages, each with one input and one output. The output ($0_n$) of each stage is connected to the input of the following stage. The logic output of each stage reverses when its input goes through the transition from logic 1 to logic 0. Thus, a full cycle of any stage requires two cycles of the preceding stage. This results in a frequency reduction of $2^{14}$ (or 16,384:1) in this 14 stage binary counter. This reduction allows a 10 minute cycle to be driven by a 27.3 Hz oscillator. As a general rule, oscillators are more accurate at higher frequencies.

The stages are referred to as $Q_1$–$Q_{14}$. $Q_{14}$, the last (or slowest) stage of this counter, divides the overall cycle into two halves. During the first half, it is at logic 0, and during the second, at logic 1. Similarly, $Q_{13}$ divides the cycle into quarters; $Q_{12}$ into eighths; and $Q_{11}$ into sixteenths. It can be determined which of 16 even divisions or sequences of the cycle the timer is in by monitoring the output of these last four stages. The selected arrangement of AND, NAND, OR and NOR gates interprets these four outputs, and drives the appropriate output transistors, which in turn powers the solenoid valves. The first ten stages of binary counter (not externally connected) serve only as frequency reduction. They could, however, be used to achieve higher resolutions of cycle position if required in more exacting applications.

The logic module includes a number of logic gates, arranged in combinations selected to provide output to power the solenoid drivers during the prescribed time interval for each valve function. Since the function of AND, NAND, OR and NOR gates is well known, and the particular arrangement of these gates will of course depend upon the intervals selected, and the timing oscillator and binary counter devices used, the particular arrangement that can be utilized in a given circuit will be apparent to those skilled in this art. The arrangements shown in the drawings are illustrative of the combinations that can be made.

One minor alteration to the circuitry can give much greater accuracy and repeatability when required. This involves the elimination of the oscillator and driving the binary counter with an unfiltered connection to the secondary winding of the power supply transformer. This essentially uses the power line frequency as a substitute for the oscillator. While power line frequency is extremely accurate, there is the disadvantage of not being able to adjust this frequency. To some extent, this problem can be alleviated by incorporation of a "divide by n counter". This is an integrated circuit that is wired to give one output pulse for each n input pulses, where n can be any integer from 3 to 9. The various combinations obtainable by selecting the right n and the right number of binary counter stages after it give a fairly wide selection of cycle duration times.

While these electronic sequence timers can be used to perform any time delay or sequence function on any dryer, regardless of auxiliary control or sensing devices, heated or heaterless, its primary application would be as a self-sufficient timing control for heatless dryers.

Preferred embodiments of the apparatus of the invention are illustrated in the following drawings, in which.

Figure 1:
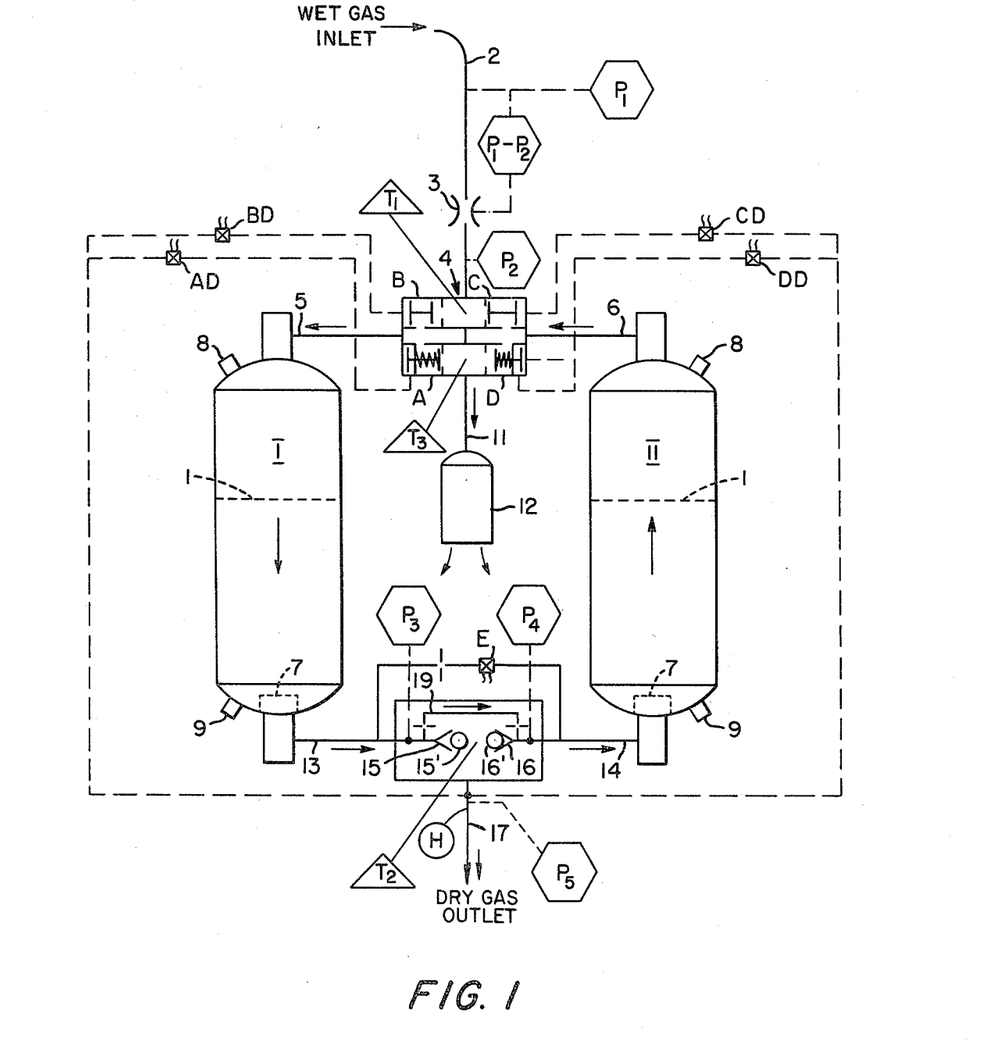
FIG. 1 is a schematic view of a two-bed heatless desiccant dryer in accordance with the invention.

The dryer of FIG. 1 is composed of a pair of desiccant tanks I and II. These tanks are disposed vertically. Each tank contains a bed 1 of desiccant such as silica gel or activated alumina. Also provided in tanks I and II are desiccant fill and drain ports 8, 9 for draining and filling of desiccant in the tanks.

Only two lines are required connecting the two tanks at top and bottom, respectively, for introduction of influent gas containing moisture to be removed, and for delivery of dry effluent gas, freed from moisture after having passed through the dryer, with the necessary valves A,B,C,D for switching flow of influent and effluent gas to and from each tank.

Figure 2:
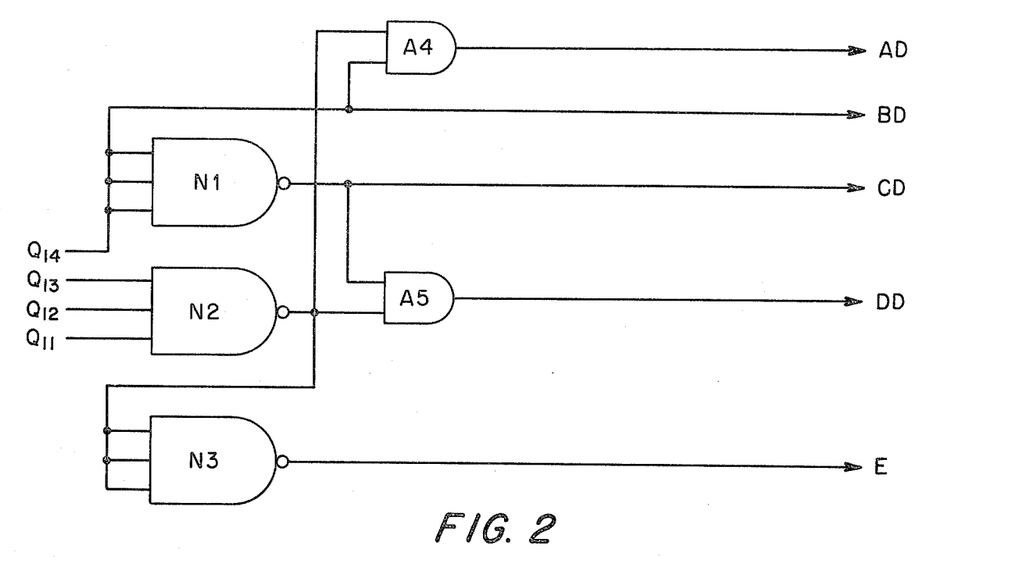
FIG. 2 is a detail view of the logic module circuit of the electronic sequence timer of the heatless dryer in accordance with FIG. 1.
Figure 3:
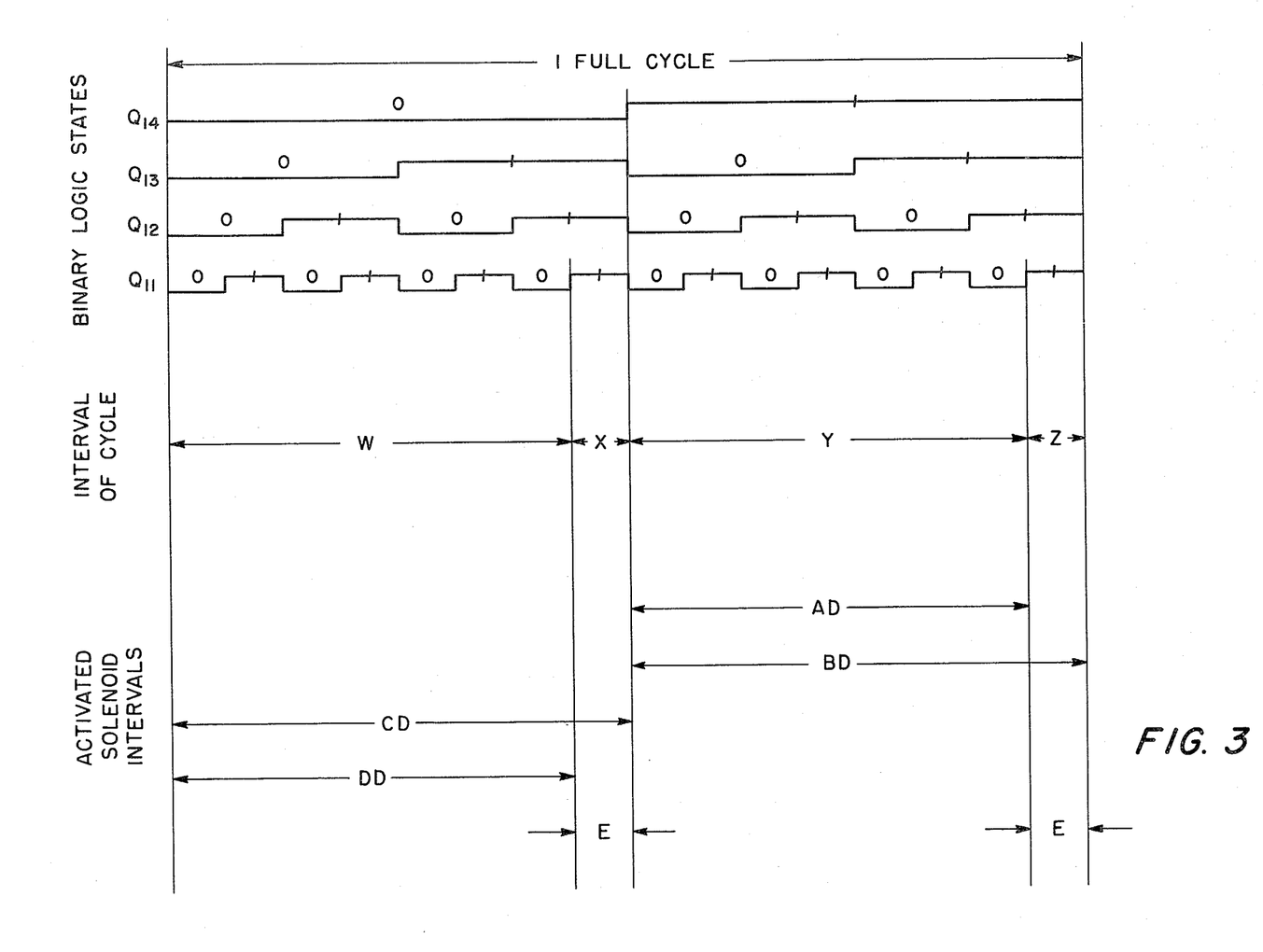
FIG. 3 is a logic diagram showing the timing interval sequence of the timer circuit of FIG. 2.
Figure 9:
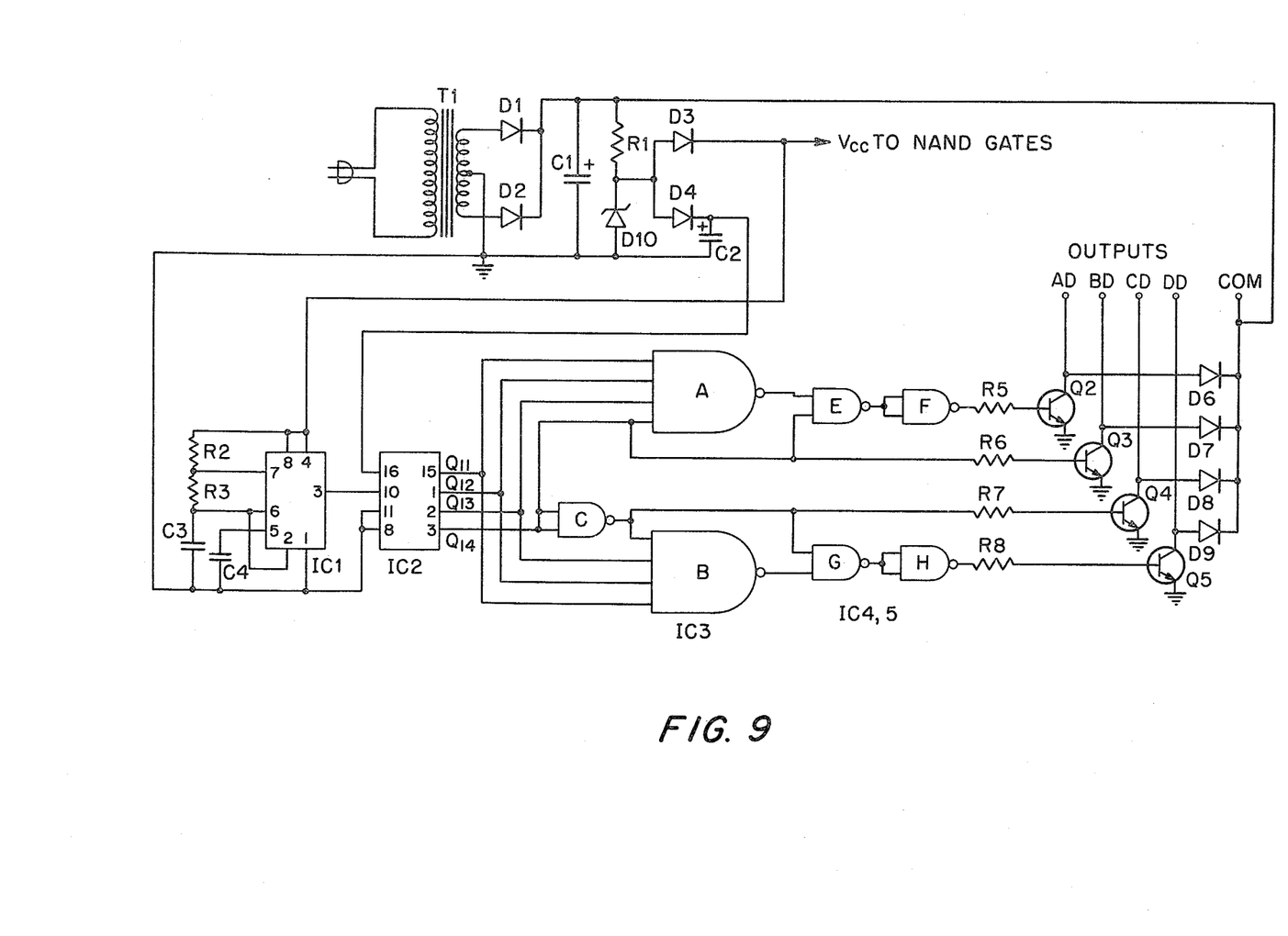
FIG. 9 is a detail view of another electronic sequence timer circuit for use in the dryer of FIG. 1 or FIG. 4.

The four valves A,B,C,D are pneumatically driven by solenoid operated pilot valves AD, BD, CD and DD, which are connected to and controlled by the electronic sequence timer T of which the time delay oscillator and binary counter components are interconnected in circuitry as shown in FIG. 9 to the logic module whose circuitry is shown in FIG. 2. The timing intervals for solenoid valves AD,BD,CD and DD are shown in FIG. 3.

As seen in FIG. 9, 24 volt D.C. power is derived through a 36 volt center tapped transformer T1 and rectifiers D1 and D2, and filtered with a 2200 Mfd, electrolytic capacitor C1.

The low voltage logic potential is maintained by supplying a 6.2 V 0.4 W Zener diode D10 through a power-dissipating 470Ω resistor R1 from the filytered 24 V.D.C. supply. While this zener regulation adds the advantage of power supply noise isolation to the function of reducing the supply voltage, it might not be necessary if the initial filtered supply and solenoid operating voltage were in the operating range of the logic IC's (15 volts or less).

This low voltage is split into two supplies by diodes D3 and D4 so that the charge on 250 Mfd capacitor C2 can be used to maintain a small leakage current into the integrated circuit IC2 to retain memory of cycle position in the event of short term power failure. Two diodes are used to maintain the same supply voltage ($V_{cc}$) on all logic integrated circuits (approximately 6 volts).

The integrated circuit 555 timer IC1 is set to oscillate at 68.26667 Hz. for a 4 minute drying cycle and 27.30667 Hz. for a 10 minute cycle by the proper selection of precision resistors R2 and R3 and capacitor C3 used in its oscillator circuit.

The 555 timer is a highly stable device for generating accurate time delays or oscillation with a normally-on and normally-off output timing from microseconds through hours, an adjustable duty cycle, and operational in both astable and monostable modes. In the system shown, it is operated in the astable mode, in which the timer will trigger itself and free-run as a multivibrator. The external capacitor charges through R2+R3 and discharges through R3. Thus, the duty cycle may be set precisely by the ratio of these two resistors, and the resistors can be changed as required to achieve the desired ratio.

The capacitor charges and discharges between $\frac{1}{3}$ $V_{cc}$ and $\frac{2}{3}$ $V_{cc}$. The charge and discharge times and frequency are independent of the supply voltage. The charge time is given by the equation:

$t_1 = 0.693 (R2+R3)C3$ and the discharge time by the equation:

$t_2 = 0.693 (R3)C3$

Thus, the total period is T=$t_1+t_2$=0.693 (R2+2R3)C3. Any desired time cycle can of course be selected, and IC1 set accordingly.

The output of the oscillator drives the first stage of a 14 bit I.C. binary counter IC2.

This counter is a CMOS fourteen stage ripple-carry binary counter/divider, and consists of a pulse input shaping circuit, reset line driver circuitry, and fourteen ripple-carry binary counter stages. Buffered outputs are externally available from stages 1 and 4 through 14. The counter is reset to its "all-zeros" state by a high level on the reset inverter input line. This reset is not used in this application. Each counter stage is a static master-slave flip flop. The counter is advanced one count on the negative-going transition of each input pulse. With this integrated circuit, each bit is changed in stage between logic 0 and logic 1 when triggered by the negative going pulse (logic 1 to logic 0 of the preceding stage). Each stage therefore reverses logic state at half the frequency of the preceding stage, keeping a 14 bit binary record of where the unit is in its cycle, as seen in FIG. 3. In the last portion of the timing cycle, all 14 bits are at logic state 1. The next negative swing of the oscillator drives all bits to logic state 0, and the next cycle begins. The last four bits $Q_{11}$, $Q_{12}$, $Q_{13}$, and $Q_{14}$ of this counter contain the required information to divide the cycle into 16 even segments, and identify which portion the unit is in at all times.

These four bits are fed to the logic module whose circuitry is shown in FIG. 2, composed of a series of logic gates which determine the proper combination of logic states which satisfies the conditions under which each of the five outputs (four on the 10 minute cycle) should be in their driving state.

The circuit includes three NAND gates N1, N2, N3 and two AND gates A4, A5.

One input of AND gate A4 is connected to NAND gate N2, while the other is connected directly to $Q_{14}$. The output of A4 is connected via the driving transistor to solenoid valve AD. Only if both inputs are 1 is solenoid A powered.

$Q_{14}$ is connected via the driving transistor to solenoid valve BD without the intervention of any gate. It is powered when the $Q_{14}$ output is 1. NAND gate N1 is connected via the driving transistor to solenoid valve CD, AND gate A5 is similarly connected to solenoid valve DD, and NAND gate N3 is similarly connected to solenoid valve E.

Each of the NAND gates is of the three-input type, with the result that the only time there is 0 output is when all three inputs are 1. Since however all three inputs of N1 are connected to the same stage, $Q_{14}$, this NAND gate is simply an inverter, and gives an output that drives the solenoid CD through its output transistor, only when there is 0 output from $Q_{14}$, but not otherwise.

NAND gate N2 has its three inputs connected respectively to stages $Q_{11}$, $Q_{12}$ and $Q_{13}$, and therefore gives an output of 1 unless all of $Q_{11}$, $Q_{12}$ and $Q_{13}$ are 1.

NAND gate N3 is powered from NAND gate N2, and since all three inputs are so powered, the gate serves simply as an inverter of the output of N2. Thus, when the output from N2 is 0, N3's output is 1, and this output is transmitted via the output transistor to power solenoid valve E.

Solenoid valve DD is powered through its driving transistor by AND gate A5, which has two inputs, one from N1 and one from N2. There is consequently an output of 1 from A5 to the solenoid valve DD driving transistor only if both N1 and N2 give outputs of 1.

NAND gate N1 is at 1 during W and X, and at 0 during Y and Z. NAND gate N2 is at 1 during W and Y, and at 0 during X and Z. NAND gate N3 is at 1 during X and Z, and at 0 during W and Y. AND gate A4 is at 1 during Y, and at 0 during W,X and Z. AND gate A5 is at 1 during W, and at 0 during X, Y and Z.

Accordingly, the time intervals dictated by the timer are as shown in FIG. 3. Solenoid valve CD is powered during intervals W and X, and solenoid valve DD during interval W. Solenoid valve E is powered during intervals X and Z. Solenoid valve BD is powered during intervals Y and Z, and solenoid valve AD during interval Y.

The power outputs of these gates switch the solenoid drivers or driving transistors $Q_1$, $Q_2$, $Q_3$, $Q_4$ and $Q_5$ on and off through current limiting resistors R4,R5,R6,R7 and R8. These transistors drive the solenoid valve AD,BD,CD,DD,E shown in FIG. 1 and are protected from inductive fly-back by diodes D5, D6, D7, D8 and D9.

The intervals W+X and Y+Z correspond to the drying cycle times for the tanks I and II, respectively.

The intervals W and Y correspond to the regeneration stage for the tanks II and I, respectively, and the intervals X and Z correspond to the repressurization stage when regeneration is complete. Thus, valves A and D control regeneration flow and halt chamber effluent flow when regeneration is complete, allowing repressurization, while valves B and C change influent from one chamber to the other.

The line 2 conducts the moist influent gas past the pressure gauges P1, P2 and the pressure-reducing orifice 3 to the four-component inlet switching valve 4, including valves A,B,C,D. One of valve C,B directs the flow of influent gas to one of two inlet lines 5 and 6, one of lines 5, 6 always leading the influent gas to the top of each tank I, II and the other of lines 5, 6 according to valves A,D leading the purge flow of regeneration effluent gas to the exhaust via line 11 and muffler 12, venting to atmosphere. Temperature gauges T1, T3 determine gas temperature in the valves A, B, C, D, and gauge T2 detects temperature in the effluent entering line 17.

At the bottom of each tank is a desiccant support 7 made of a perforated metal cylinder, retaining the desiccant bed 1 in the tanks I and II. Outlet lines 13 and 14 from the bottom of tanks I and II, respectively, lead to the pair of ball check valves 15, 16. Valve 4 is operated by the electronic sequence timer through its solenoid operated pilot valves, but valves 15, 16 are pressure operated. The ball in the effluent line from the on-stream tank I and II is displaced on switching and start up of on-stream flow in lines 13, 14, while the other one of the balls 15', 16' at such switching time moves against the seat, closing off the lines 13, 14 leading to the chamber undergoing regeneration at reduced pressure, and thus directing main effluent flow via the outlet line 17.

Disposed in each outlet lines 13 and 14 is a filter screen, which is movable, and is also made of sintered stainless wire mesh. This acts to retain any desiccant particles that might otherwise be carried out from the bed 1 past the desiccant support 7, to keep the outlet valves 15, 16 and the remainder of the system clean of such particles.

From valves 15, 16 extends the dry gas effluent delivery line 17, to deliver the dried effluent gas from the dryer to the system being supplied therewith. In the line 17 there can be placed an outlet pressure gauge P5 and a humidity sensor H, but these are optional, and can be omitted.

A cross line 19 having a narrow passage bridges the outlet lines 13, 14 bypassing valves 15,16 when either is closed, and providing purge flow to the line 13, 14 leading to the off-stream tank. Line 19 due to its small diameter has a pressure-reducing function, inasmuch as downstream thereof pressure is reduced to atmospheric when one of purge valves A,D is open, and it also meters the volume of purge flow bed off the effluent gas at valves 15, 16 for regeneration of the spent tank. Purge exhaust valve A,D control purge flow via lines 5, 6 according to signal from the electronic sequencer which opens and closes them at the proper time, via the appropriate solenoid actuated pilot valves. Solenoid valve E, on another restricted flow line, is operated during repressurization to speed this process on dryers with faster cycle times. It is optional, depending on dryer size and speed.

If the left-hand tank I is on the drying cycle, and the right-hand tank II on the regenerating cycle, then valves 4B and D are open, 4C and A closed, and the operation of the dryer proceeds as follows: wet gas influent at, for example, 100 psig, and a flow rate of 305 s.c.f.m., saturated at 80° F., enters through the inlet line 2, passes the valve 4B (valve C being closed) and enters the top of the first tank I, and passes thence downwardly through the bed of desiccant 1 therein, for example, silica gel or activated alumina, to the bottom of the tank, and thence through supports 7 and line 13, valve 15 to the dry gas outlet line 17. Effluent gas is delivered there at 100 psig and 265 s.c.f.m., dewpoint minus 100° F. The ball 16' prevents entry of dry gas into line 14 except via line 19. This metered remainder of the dry gas effluent, 40 s.c.f.m., is bled off through the line 19, where its pressure is reduced to atmospheric, and then passes through line 14 to the bottom of the second tank II, which is on the regeneration cycle. Purge flow passes upwardly through the desiccant bed 1, and emerges at the top into line 6, and thence passes through valve 4D, to line 11 and muffler 12, where it is vented to the atmosphere.

This cycle continues until the regeneration time cycle time, W, is completed, whereupon the electronic sequencer closes purge exhaust valve D by deactivating pilot valve DD. Accordingly, line 19 slowly repressurizes tank II. The system continues with tank I on the drying cycle until the fixed cycle time W+X has elapsed, whereupon the electronic sequence timer reverse valves 4C, B, and the cycle begins again with the chambers reversed.

The time W+X (and Y+Z) that each bed will be on the drying cycle is greater by interval X (and Z) than the length of time W (and Y) required to regenerate the spent bed. When regeneration time has elapsed, valve D (or A) is shut off, and the regenerated tank is then automatically and slowly repressurized via line 19. This repressurization may be accelerated by opening optional valve E.

When the fixed cycle time W+X has elapsed, the electronic sequence timer switches valves 4C,B, so that wet gas influent entering through the inlet 2 passes through line 6 to the top of tank II, while check valve 16 shifts to open line 14, whereupon check valve 15 shifts to close line 13, so that dry gas effluent can now pass from the bottom of the tank II to the dry gas delivery line 17, while line 13 is closed, except to the flow of purge gas bypassing valve 15 via the cross-line 19, now reversed. Purge flow proceeds via line 13 to the bottom of tank I, which is on the regeneration cycle, and thence upwardly through the bed to the line 5 and thence through valve 4A, line 11, and muffler 12, where it is vented to the atmosphere.

Usually, the drying cycle is carried out with gas at a superatmospheric pressure, of the order of 15 to 350 psig. The orifice in the cross-line 19 in combination with the purge exhaust valves A and D ensures that the regeneration cycle is carried out at a pressure considerably reduced from that at which the adsorption cycle is effected.

Figure 4:
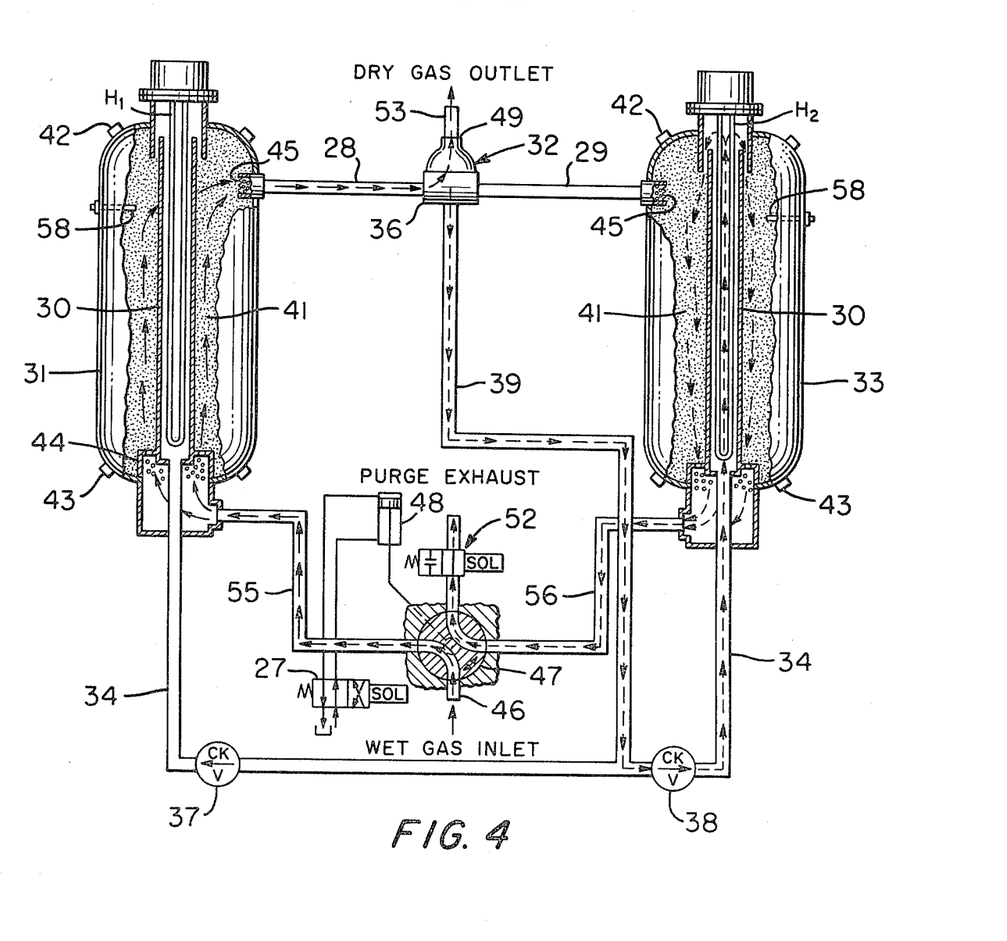
FIG. 4 is a schematic view of an electronic timer-controlled two-bed heat-regenerated desiccant dryer in accordance with the invention.

The desiccant dryer of FIG. 4 is designed to regenerate a spent desiccant bed by a heated effluent gas purge. For this purpose, an electric heater $H_1, H_2$ is provided through which a line 30 passes in flow connection with line 34 leading to the bottom of either vessel 31, 33 from the shuttle valve 32 and bleed flow passage 36 via the check valves 37, 38 and line 39.

The dryer is composed of a pair of sorbent vessels 31, 33 which are disposed vertically. Each vessel contains a bed of sorbent 41, such as alumina or silica gel. Also provided in the vessels are sorbent fill and drain ports 42,43 for draining or filling of sorbent in the vessels. At the bottom of each vessel is a sorbent support 44, made of perforated stainless steel sheet, and at the top of the vessel at the outlet therefrom is a filter screen 45, which may be removable, and is made of stainless steel wire mesh or perforated stainless steel sheet. These screens retain the larger sorbent particles which might otherwise be carried out from the vessels when the vessels are on-stream, and keep the remainder of the system clean of such particles, but of course they do not screen out dust and fines.

Moisture sensors 58 are provided in each bed near the effluent outlet, to detect the moisture front before it can move out of the bed.

Figure 5:
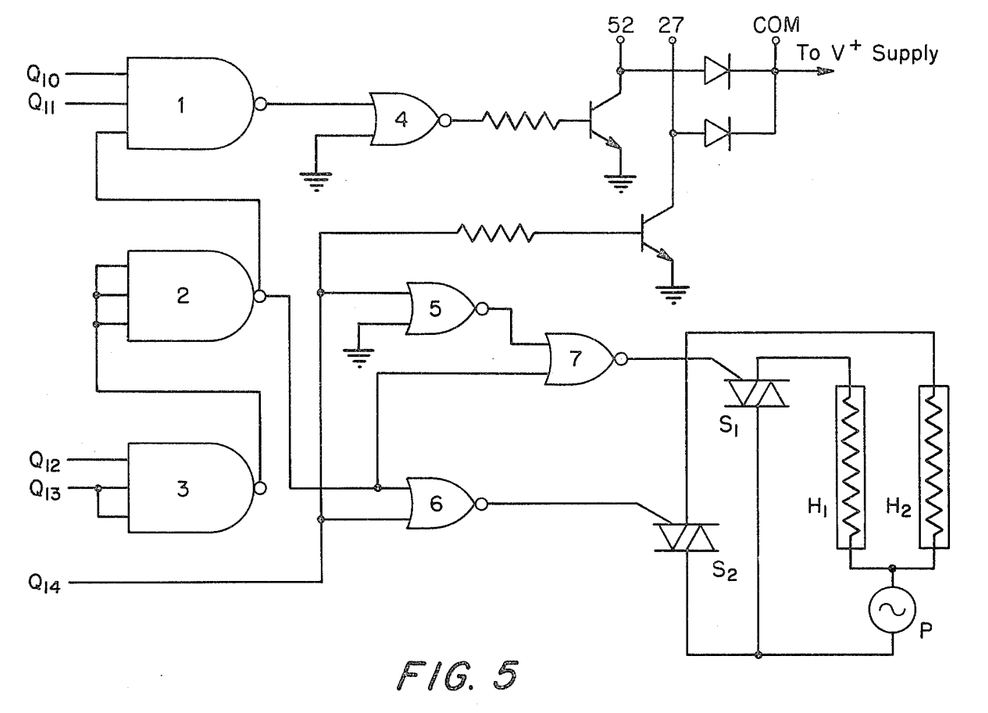
FIG. 5 is a detail view of the electronic sequence timer circuit of the heat-reactivated dryer of FIG. 4.
Figure 6:
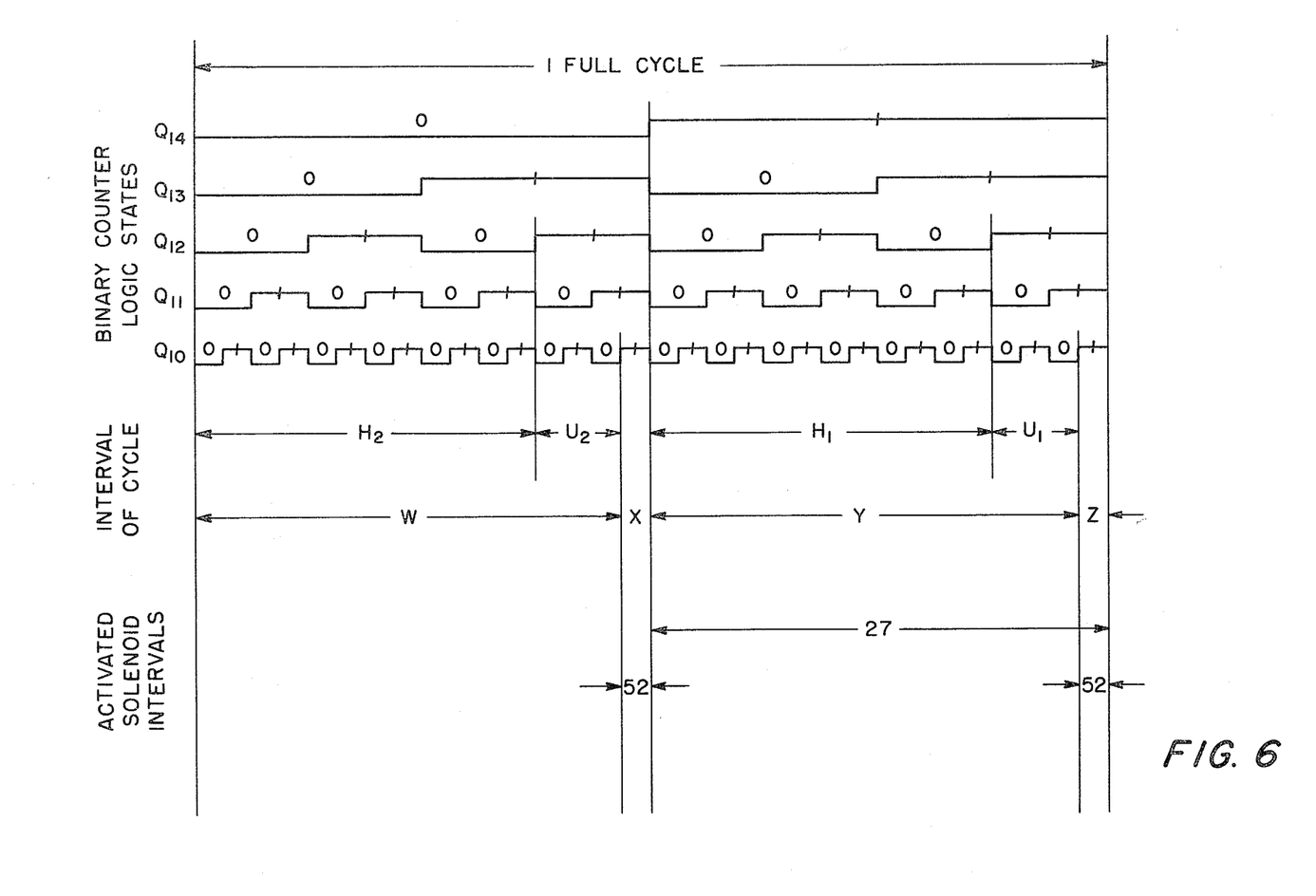
FIG. 6 is a logic diagram showing the timing interval sequence of the timer circuit of FIG. 5.

The system includes an inlet line 46 leading to a four-way valve 47, switched by actuator 48, which is actuated by solenoid valve 27 which is controlled by the electronic sequence timer whose circuitry is shown in FIG. 5 according to the intervals prescribed by the electronic timer, shown in FIG. 6. Thus, valve 47 directs the flow of influent gas to one or two inlet lines 55 and 56, leading the influent gas to the bottom of each vessel 31, 33. The four-way valve 47 also directs purge flow from the off-stream vessel being regenerated to the electrically actuated purge exhaust valve 52.

The check valves 37, 38 ensure unidirectional flow to either vessel 31 or 33, whichever is being regenerated. The on-stream bed is at higher pressure than the pressure in the line before the check valves, and the off-stream bed is at lower pressure; thus, flow proceeds only through the check valve to the off-stream bed.

At the top of each vessel 31, 33 is an outlet line 28, 29, both leading to the free-rolling ball shuttle valve 32.

The valve 47 is operated by the compressed air cylinder 48, reciprocated by air pressure controlled by the solenoid valve 27, according to a signal given by the electronic sequence timer. Valve 32 simply responds to the change in flow through the vessels 31, 33, when the valve 47 is switched. From valve 32 at outlet port 49 extends the effluent gas delivery line 53 to deliver the dried effluent gas from the dryer to the system being supplied therewith.

The electronic sequence timer will actuate valve 47 at the end of the predetermined driving time interval, $W+X$ or $Y+Z$ seen in FIG. 6.

However, regeneration time, i.e., W or Y, is less than drying time and so at the end of this interval the electronic sequence timer shuts the purge exhaust valve 52, allowing the regenerated vessel 31 or 33 to repressurize.

The operation of the driver is as follows: Wet influent gas at line pressure is introduced through line 46 to the four-way switching valve 47, where it is cycled to one of the vessels 31 or 33. If vessel 31 is on the drying cycle, the four-way switching valve 47 is set to divert the influent gas through line 55 to the bottom of vessel 31. The influent gas passes upwardly through the desiccant support 44 and through the sorbent bed 41 to the top, the moisture being adsorbed on the desiccant as it does so, and the dry gas passes to and through the outlet line 28, to the free-rolling ball shuttle valve 32. When the differential pressure across the ball reaches the predetermined limit, it blows the ball off its seat, opening the line from vessel 31, and closing the line to vessel 33, and gas flow then proceeds through the valve 32 to the delivery line 53.

Purge flow proceeds past valve 32 via line 39 to valve 38 and then through line 34 and heater $H_2$ to the top of vessel 33, whence it proceeds by downflow through bed 41 and line 56 through valve 47 to purge exhaust. Upon completion of interval $H_2$, the electronic sequencer deactivates triac $S_2$, stopping the supply of power to the heating element $H_2$, allowing the bed to cool for the remainder of the purge cycle. This continues for interval $U_2$, or the remainder of interval W, whereupon the timer closes purge exhaust valve 52, allowing vessel 33 to repressurize.

The dryer continues on this cycle until the prescribed drying time $W+X$ (or $Y+Z$) has elapsed, whereupon the timer actuates valve 27 to reciprocate the piston of cylinder 48, switching valve 47 to the next 90° position. This diverts the influent gas entering via line 46 from line 55 to line 56, to enter the bottom of the second vessel 33; effluent gas flow leaves the top of vessel 33 via line 29. When such effluent flow reaches the valve 32 the ball is blown off its seat, opening the line from vessel 33, and closing the line to vessel 31, and proceeds then through the valve chamber to delivery line 53.

Purge gas from the valve 32 is now conducted through the line 34 to the bottom of vessel 31, whence it passes upwardly through the heater $H_1$ and then downwardly through the sorbent bed 41 in the sorbent chamber of vessel 31, emerging at the bottom of the vessel, and then passes through line 55 and valve 47 to the purge exhaust valve 52.

Upon completion of interval $H_1$, the electronic sequencer deactivates triac $S_1$, stopping the supply of power to heating element $H_1$ allowing the purge gas to cool the bed.

This purge flow is then continued until the interval Y has elapsed, whereupon the timer closes purge exhaust valve 52 allowing vessel 31 to repressurize. Upon completion of interval Z, the predetermined maximum permissible moisture level in the effluent gas from the vessel 33 is reached, whereupon the timer deactivates valve 27. Valve 47 is turned 90° to its original position, and the first cycle repeated.

The timer circuit for the heat reactivated dryer of FIG. 4 is shown in FIG. 5. This circuit is similar to that of FIG. 2, with the exception of the logic gate module, and consequently only this portion of the circuit will be discussed.

As seen in FIG. 5, counter stages $Q_{10}$ and $Q_{11}$ are connected as an input to NAND gate 1, whose other input is from the output of NAND gate 2. Stages $Q_{12}$ and $Q_{13}$ are connected as an input to NAND gate 3, $Q_{13}$ providing two inputs to that gate. Each of these stages accordingly provides one or two of the three inputs of these NAND gates. The last stage $Q_{14}$ is connected to solenoid valve 27 through its driving transistor, and also as one input to NOR gates 5 and 6. NAND gate 2 has all three inputs connected via NAND gate 3 to $Q_{12}$ and $Q_{13}$. The result is that NAND gate 2 serves as an inverter for NAND gate 3.

Accordingly, NAND gate 1 always gives an output of 1 unless all of stages $Q_{10}$, $Q_{11}$ and NAND gate 2 give outputs of 1, in which event the output is 0. NAND gate 2 gives a similar response, but because it inverts, NAND gate 3, its output is 1 only when both $Q_{12}$ and $Q_{13}$ give outputs of 1.

NAND gate 1 feeds one input of NOR gate 4, while the other input is grounded, so NOR gate 4 serves as an inverter for this output, and this has an output of 1 only when NOR gate 1 gives an output of 0. NOR gate 4 powers purge exhaust solenoid valve 52 through its driving transistor.

The output from NAND gate 2 is fed as one input to NAND gate 1, and as one input to NOR gates 6 and 7. The other input of NOR gate 5 is grounded, and the other input of NOR gate 6 is from stage $Q_{14}$. The other input of NOR gate 7 is fed by the output of NOR gate 5, which accordingly serves as an inverter for stage $Q_{14}$.

Triac $S_1$ has its input from NOR gate 7, and triac $S_2$ has its input from NOR gate 6. Triac $S_1$ controls heater $H_1$, and triac $S_2$ controls heater $H_2$. The AC power source is designated P.

NAND gate 1 accordingly gives an output of 0 during the intervals X and Z (as seen in FIG. 6) and 1 during the intervals W and Y.

NAND gate 2 gives an output of 1 during the intervals $U_2$, X, $U_1$ and Z, and 0 during intervals $H_1$ and $H_2$.

NAND gate 3 gives an output of 0 during the same intervals $U_2$, $X_1$, $U_1$ and Z, and an output of 1 during the same intervals $H_1$ and $H_2$.

NOR gate 4 gives an output of 1 during the intervals X and Z, and an output of 0 during the intervals W and Y.

NOR gate 5 gives an output of 1 during the interval W+X, and an output of 0 during the interval Y+Z.

NOR gate 6 gives an output of 1 during the interval $H_2$, and an output of 0 during the intervals $U_2$+X+$H_1$+$U_1$+Z.

NOR gate 7 gives an output of 1 during the interval $H_1$, and an output of 0 during the intervals $H_2$+$U_2$+X and $U_1$+Z.

The result accordingly is that the actuating cylinder 48 for valve 47 is actuated at the end of intervals W+X and Y+Z by solenoid valve 27, while the purge exhaust valve 52 is actuated at the end of interval W and at the end of interval Y.

FIGS. 7 and 8 and 9 and 10 show two alternative schemes for a logic gate module and timed interval sequence for either the dryer of FIGS. 1 to 3 or the dryer of FIGS. 4 to 6.

Figure 7:
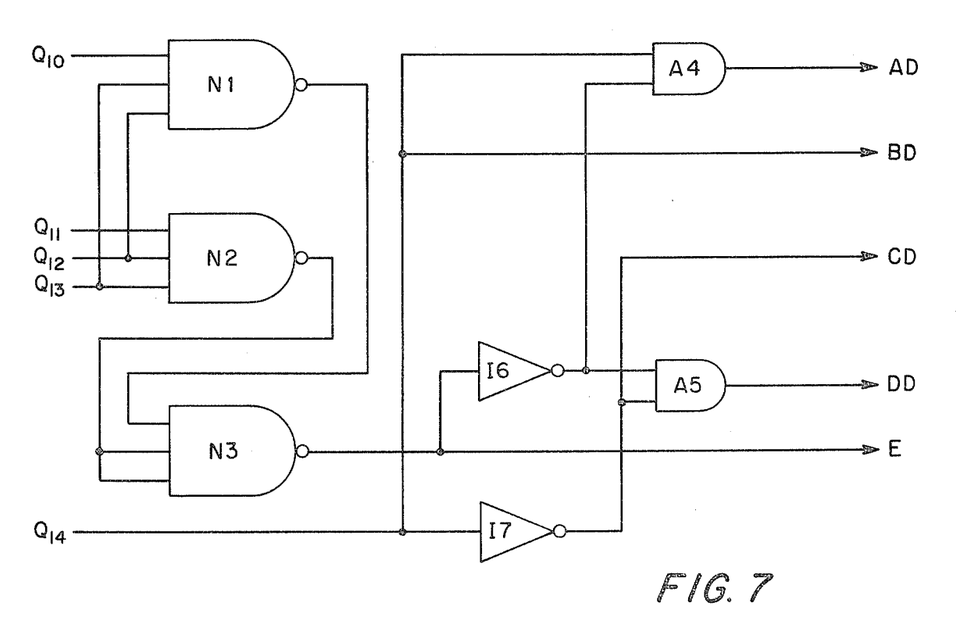
FIG. 7 is a detail view of another electronic sequence timer circuit for use in the dryer of FIG. 1 or FIG. 4.

The circuit in which the logic gate module of FIG. 7 is used is identical to that of FIG. 9, except in the logic gate module, and consequently only this portion of the circuit is shown.

The circuit includes three NAND gates, N1, N2 and N3, two AND gates A4, A5 and two inverters I6, I7.

Each of the NAND gates N1, N2 and N3 has three inputs. NAND gate N1 receives as inputs the outputs of stages $Q_{10}$, $Q_{12}$ and $Q_{13}$. NAND gate N2 receives the outputs of stages $Q_{11}$, $Q_{12}$ and $Q_{13}$. NAND gate N3 receives only the outputs of NAND gates N1 and N2, the latter feeding two of the inputs of N3.

The output of NAND gate N3 drives solenoid valve E through its driving transistor. It also serves inverter I6, which feeds the inverted output to one of the inputs of AND gates A4 and A5. The other input of gate A4 is fed by the last counter stage $Q_{14}$. One input of gate A5 is also fed from the last stage $Q_{14}$, but via the inverter I7. The other input of gate A5 is fed via inverter I6 from the output of NAND gate N3.

Figure 8:
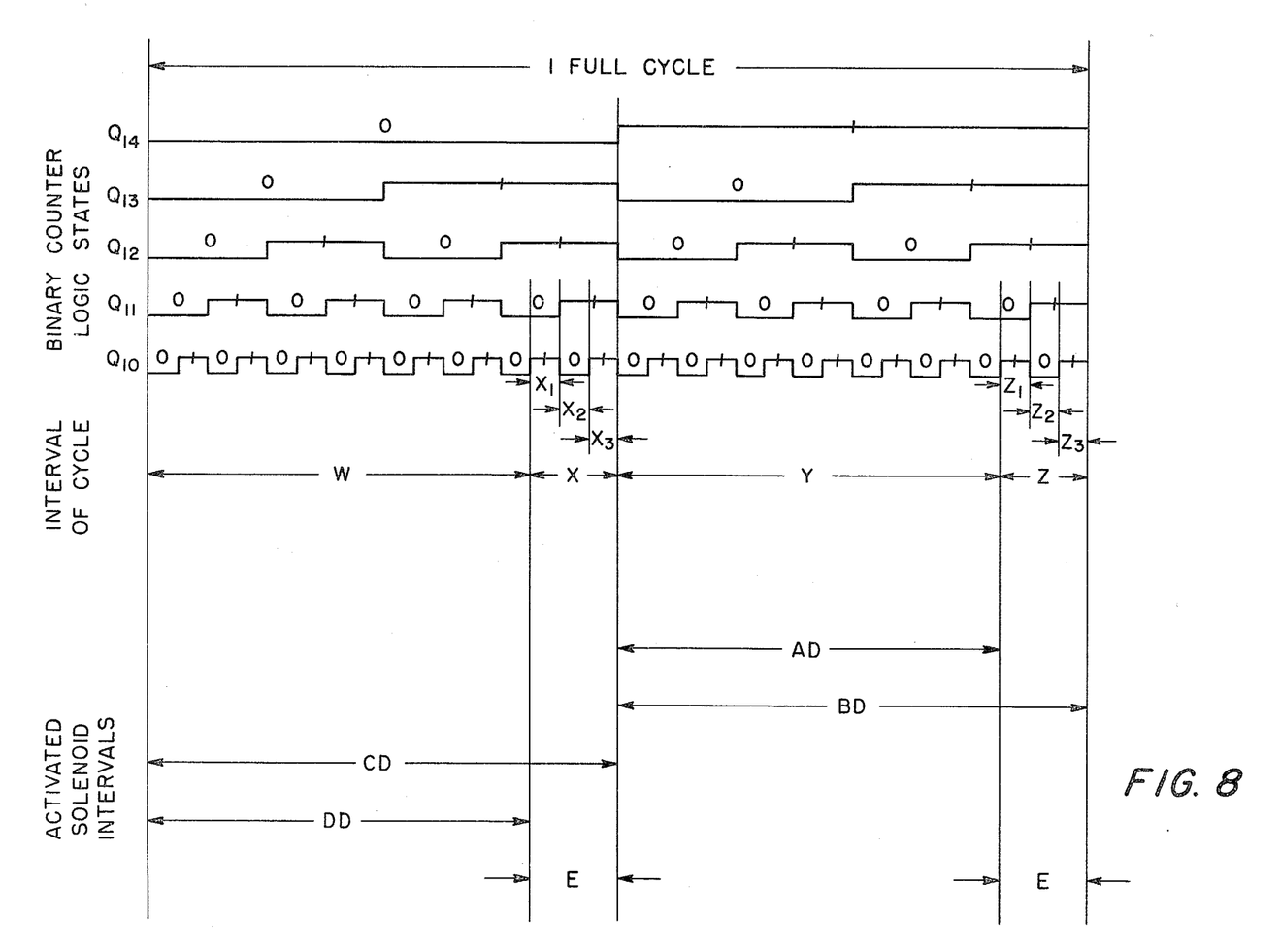
FIG. 8 is a logic diagram showing the timing interval sequence of the timer circuit of FIG. 7.

Accordingly, NAND gate N1 delivers an output of 0 during the intervals $X_1$, $X_3$, $Z_1$ and $Z_3$, and 1 during the intervals W, $X_2$, Y and $Z_2$.

NAND gate N2 gives an output of 0 during the intervals $X_2$, $X_3$, $Z_2$ and $Z_3$, and an output of 1 during the intervals W, $X_1$, Y and $Z_1$.

NAND gate N3 gives an output of 1 during X and Z, and an output of 0 during W and Y.

AND gate A4 gives an output of 1 during Y, and an output of 0 during W, X and Z.

AND gate A5 gives an output of 1 during W, and an output of 0 during X, Y and Z.

Inverter I6 gives an output of 0 during X and Z and an output of 1 during W and Y, and inverter I7 gives an output of 1 during W and X, and 0 during Y and Z.

Thus, this circuit illustrates that the duration of the time intervals X and Z need not be limited to those portions of the cycle which can be obtained by successive halving of the cycles. In this arrangement, both X and Z are 3/32 of the full cycle time.

This is achieved by dividing these intervals into three segments, as shown, each 1/32 cycle in length. Stages $Q_{11}$ through $Q_{14}$ are augmented by Stage $Q_{10}$ for finer cycle resolution. NAND gate N1 is driven to logic 0 during the first and third of these segments, and NAND gate N2 during the second and third. Any combination of these events allows NAND gate N3 to go to logic 1 output, thus defining the new intervals for X and Z.

As seen in FIG. 9, counter stage $Q_{11}$ is connected as an input to each of NAND gates A and B. Stage $Q_{12}$ is also so connected, and so is stage $Q_{13}$. Each of these stages accordingly provides one of the four inputs of these NAND gates. The last stage $Q_{14}$ is connected directly as the fourth input of NAND gate A, but only indirectly as the two inputs via NAND gate C to the fourth input of NAND gate B. The result is that NAND gate C serves as an inverter, since both of its two inputs are connected to stage $Q_{14}$. Accordingly, NAND gate A always gives an output of 1 unless all of stages $Q_{11}$, $Q_{12}$, $Q_{13}$ and $Q_{14}$ give outputs of 1 in which event the output is 0. NAND gate B gives a similar response, but because of the inverter, NAND gate C, this occurs only when $Q_{14}$ is in the opposite phase to that actuating gate A, i.e. 0 output.

NAND gate A feeds one input of NAND gate E, while the other input is fed directly by last stage $Q_{14}$, which accordingly gives an output when any of the outputs from A and stage $Q_{14}$ or both are 0.

NAND gate F serves as an inverter for this output, and powers solenoid valve AD through its driving transistor $Q_2$.

Solenoid valve BD is powered through transistor $Q_3$ by the last counter stage $Q_{14}$.

Solenoid valve CD is also powered through transistor $Q_4$ by last counter stage $Q_{14}$ inverted by NAND gate C.

The output from NAND gate B is fed as one input to NAND gate G, the other input being the inverse of the output from the last stage $Q_{14}$, the inversion being effected by NAND gate C.

Figure 10:
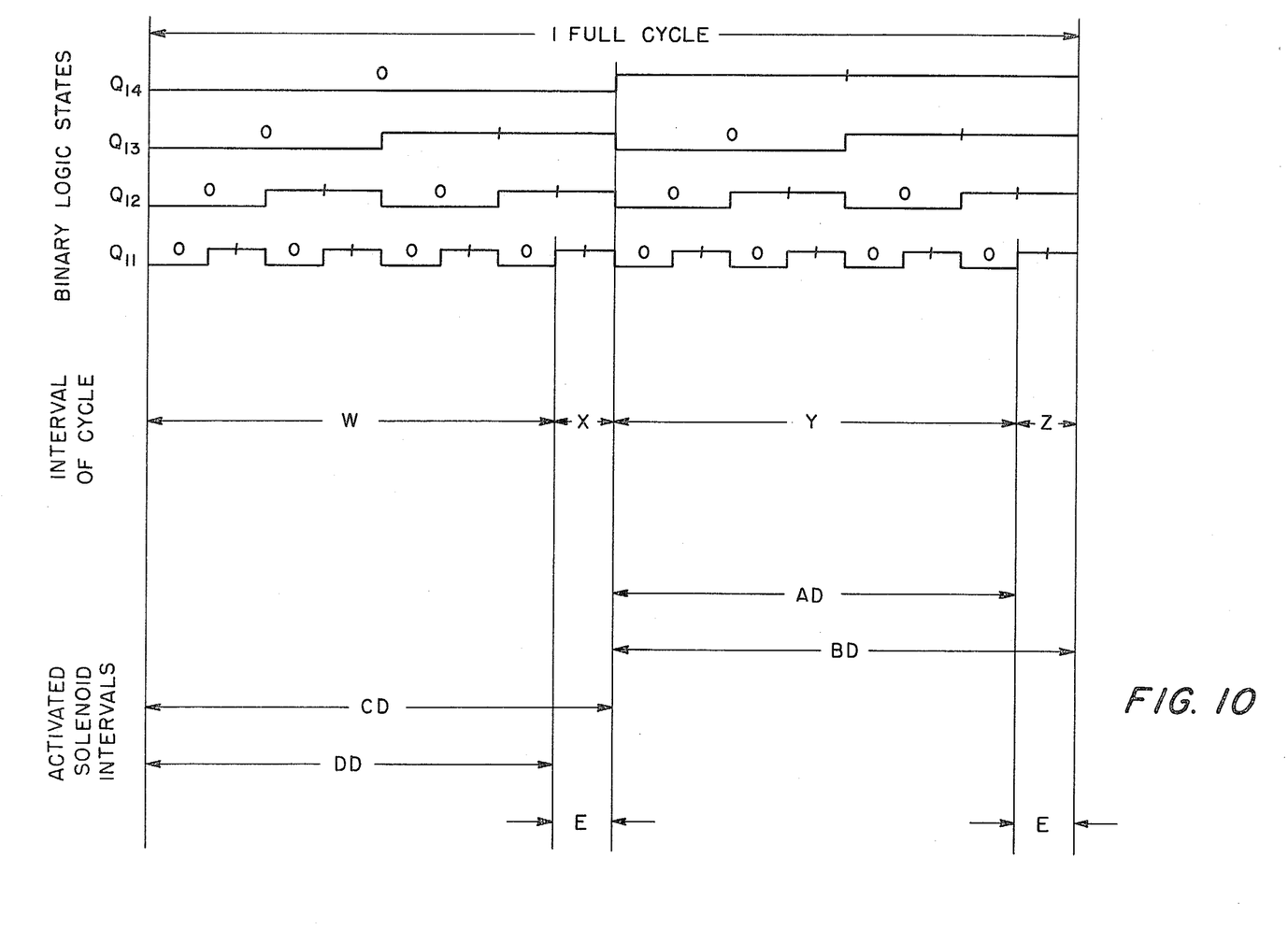
FIG. 10 is a logic diagram showing the timing interval sequence of the timer circuit of FIG. 9.

As seen in FIG. 10, NAND gate A accordingly gives an output of 1 during the intervals W+X+Y, and 0 only during the interval Z.

NAND gate B gives an output of 1 during the intervals W and Y+Z, and 0 only during interval X.

NAND gate E gives an output of 1 and F an output of 0 during the interval W+X and Z, and an output of 0, F is 1, during the interval Y.

NAND gate G gives an output of 0 (and NAND gate H an output of 1) during the interval W, and an output of 1 (while H gives an output of 0) during the intervals X+Y+Z.

NAND gate C gives an output of 1 during the interval W+X, and an output of 0 during the interval Y+Z.

The result accordingly is that the actuating cylinder for the flow control valve is actuated at the end of intervals W+X and Y+Z while the purge exhaust valve is actuated at the end of interval W and at the end of interval Y.

Accordingly, it is apparent that there are a large number of combinations of logic gates that can be made, to achieve the same timing intervals, and that any combination of sequences and timing intervals is possible with an appropriate selection of logic gates of the AND, NAND, OR and NOR types, in possible combinations with inverters.

The dryer systems of the invention can be used with any type of sorbent adapted to adsorb moisture from gases. Activated carbon, alumina, silica gel, magnesia, various metal oxides, clays, Fuller's earth, bone char, and Mobilbeads, and like moisture-adsorbing compounds, can be used as the desiccant.

Molecular sieves also can be used, since in many cases these have moisture-removing properties. This class of materials includes zeolites, both naturally-occurring and synthetic, the pores in which may vary in diameter from the order of several Angstrom units to from 12 to 14 A or more. Chabasite and analcite are representative natural zeolites that can be used. Synthetic zeolites that can be used include those described in U.S. Pat. Nos. 2,442,191 and 2,306,610. All of these materials are well known as desiccants, and detailed descriptions thereof will be found in the literature.

The dryers described and shown in the drawings are all adapted for purge flow regeneration with the purge passing in counter-flow to the wet gas influent. This, as is well known, is the most efficient way of utilizing a desiccant bed. As a wet gas passes through a desiccant bed in one direction, the moisture content of the desiccant progressively decreases, and normally the least amount of moisture will have been adsorbed at the outlet end of the bed. It is consequently only sound engineering practice to introduce the regenerating purge gas from the outlet end, so as to avoid driving moisture from the wetter part of the bed into the drier part of the bed, and thus lengthen the regeneration cycle time required. If the purge flow be introduced at the outlet end, then the moisture present there, although it may be in a small amount, will be removed by the purge flow and brought towards the wetter end of the bed. Thus, the bed is progressively regenerated from the outlet end, and all the moisture is carried for the least possible distance through the bed before it emerges at the inlet end.

Nonetheless, for some purposes, it may be desirable to run the purge flow in the same direction as the influent flow.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can be removed from the sorbent with a reduction in pressure, during regeneration, without application of heat. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, Fuller's earth, bone char and natural and synthetic zeolites. The zeolites are particularly effective for the removal of nitrogen, hydrogen and olefins, such as ethylene or propylene, from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple and forms no part of the instant invention.

In some cases, the sorbent can be used to separate a plurality of materials in a single pass. Activated alumina, for example, will adsorb both moisture vapor and carbon dioxide, in contrast to Mobilbeads which will absorb only water vapor in such a mixture.

It will, however, be understood that the process is of particular application in the drying of gases, and that this is the preferred embodiment of the invention.

Having regard to the foregoing disclosure, the following is claimed as the inventive and patentable embodiments thereof:

1. A gas fractionating apparatus comprising as the essential components at least one sorbent bed adapted for alternate periodic stagewise cyclic adsorption and regeneration; at least one solenoid valve movable between positions permitting and closing off the gas flow through the bed or beds during the stages of the adsorption and regeneration cycle; a driver for the solenoid valve; and an electronic sequence timer that times the cycling of the bed for adsorption and regeneration in a series of fixed time intervals that are the same for each cycle in sequence and are determined electronically and comprise, in combination, digital integrated circuitry including a time delay oscillator generating electric impulses at selected time intervals; a binary counter receiving and counting the electric pulses from the oscillator and storing information therein in multiples of the time intervals; and a logic module having a plurality of logic gates interpreting and responding to selected output combinations from the counter corresponding to desired fixed time intervals for the stages of the adsorption and regeneration cycle of the gas fractionating apparatus, the logic module being in operative connection with the driver for the solenoid valve, and controlling the gas flow through the adsorbent gas fractionator system according to said electronically determined fixed cycling time intervals.

2. A gas fractionating apparatus according to claim 1 in which the sorbent is a desiccant.

3. A gas fractionating apparatus according to claim 1 comprising a pair of sorbent beds, disposed in separate vessels, and interconnected for alternating reception of influent gas to be fractionated, and delivery of effluent fractionated gas, and for alternating regeneration.

4. An apparatus according to claim 3 comprising a means for reducing pressure in the sorbent bed during regeneration.

5. An apparatus according to claim 3 comprising valve means for cycling the flow of influent gas between the beds and for receiving the flow of effluent gas therefrom.

6. An apparatus according to claim 3 comprising valve means for diverting a portion of the dried effluent gas as purge through the bed being regenerated.

7. An apparatus according to claim 6 in which the purge flow is in counterflow.

8. An apparatus according to claim 1 in which the timer is set for a fixed cycling time at which under the operating conditions the concentration front has not broken out of the bed.

9. An apparatus according to claim 1 in which the time delay oscillator generates electric impulses at selected short time intervals.

10. An apparatus according to claim 9 in which the oscillator is a self-excited electronic circuit whose output is a periodic function of time.

11. An apparatus according to claim 9 in which the timer oscillator utilizes a self-triggering free-running multivibrator circuit having an external capacitor that charges through one set of resistors, and discharges through another set, so that the timing interval can be varied within a desired range by varying the impedance of these two sets of resistors or the capacitance of the external capacitor.

12. An apparatus according to claim 1 in which the binary digital counter comprises a plurality of stages which in combination store information on the number of pulses at multiples of the time intervals.

13. An aparatus according to claim 12 in which each counter stage is a static master-slave flip-flop, and the counter is advanced one count on the negative going transition of each input pulse.

14. An apparatus according to claim 1 in which the binary counter is a ripple-carry binary digital counter having ripple-carry counter stages that multiply the timing interval from one stage to the next.

15. A process for reducing the concentration of one or more first gases in a mixture thereof with a second gas to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases; and then while passing a purge flow of gaseous effluent through the other of the two beds of sorbent to desorb first gas adsorbed thereon, and reverse the advance of the concentration front of first gas in the bed, regenerating the other bed for another cycle of adsorption; periodically interchanging the beds so that alternately one bed is on regeneration and the other on the adsorption portions of the cycle; timing the cycling in fixed timing intervals that are the same for each cycle in sequence and are determined electronically by a combination of digital integrated circuitry including a time delay oscillator generating electric impulses at selected time intervals; a binary counter receiving and counting the electric pulses from the oscillator and storing information therein in multiples of the time intervals; and a logic module having a plurality of logic gates interpreting and responding to selected output combinations from the counter corresponding to desired fixed time intervals for the stages of the adsorption and regeneration cycle of the gas fractionating apparatus, and controlling cycling time at a period not shorter than the regeneration time; and switching the sorbent beds at the end of such cycling time.

16. A process in accordance with claim 15 in which the first gas is water vapor.

17. A process in accordance with claim 15 in which the sorbent is silica gel.

18. A process in accordance with claim 15 wherein the purge flow is of effluent gas from the bed sorbing the first gas.

19. A process in accordance with claim 15 which comprises removing sorbed gas at a reduced pressure relative to the pressure of adsorption.

* * * * *

UNITED STATES PATENT AND TRADEMARK OFFICE
CERTIFICATE OF CORRECTION

PATENT NO. : 4,322,223
DATED : March 30, 1982
INVENTOR(S) : Conrad Christel, Jr.

It is certified that error appears in the above—identified patent and that said Letters Patent is hereby corrected as shown below:

Column 4, line 50 : "heat" should be --heart--
Column 7, line 7 : "filytered" should be --filtered--
Column 15, line 28 : "14" should be --15--
Column 17, line 32 : "aparatus" should be --apparatus--

Signed and Sealed this

Twenty-first Day of May 1985

[SEAL]

Attest:

DONALD J. QUIGG

Attesting Officer

Acting Commissioner of Patents and Trademarks